(12) United States Patent
Kang et al.

(10) Patent No.: US 11,090,907 B2
(45) Date of Patent: Aug. 17, 2021

(54) HOT DIP ALUMINIZED STEEL MATERIAL HAVING EXCELLENT CORROSION RESISTANCE AND WORKABILITY, AND MANUFACTURING METHOD THEREFOR

(71) Applicant: POSCO, Pohang-si (KR)

(72) Inventors: Ki-Cheol Kang, Gwangyang-si (KR); Hyeon-Seok Hwang, Gwangyang-si (KR); Yon-Kyun Song, Gwangyang-si (KR); Il-Jeong Park, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/471,203

(22) PCT Filed: Dec. 22, 2017

(86) PCT No.: PCT/KR2017/015414
§ 371 (c)(1),
(2) Date: Jun. 19, 2019

(87) PCT Pub. No.: WO2018/117769
PCT Pub. Date: Jun. 28, 2018

(65) Prior Publication Data
US 2019/0381764 A1 Dec. 19, 2019

(30) Foreign Application Priority Data

Dec. 23, 2016 (KR) ........................ 10-2016-0177354

(51) Int. Cl.
*B32B 15/01* (2006.01)
*C22C 21/02* (2006.01)
(Continued)

(52) U.S. Cl.
CPC ............ *B32B 15/012* (2013.01); *C22C 21/02* (2013.01); *C23C 2/12* (2013.01); *C23C 2/16* (2013.01); *C23C 2/28* (2013.01)

(58) Field of Classification Search
None
See application file for complete search history.

(56) References Cited

U.S. PATENT DOCUMENTS 6,309,761 B1 10/2001 Guesdon et al.
8,307,680 B2 * 11/2012 Drillet ....................... C23C 2/40
72/47

(Continued)

FOREIGN PATENT DOCUMENTS

CN 102782175 11/2012
CN 103687973 3/2014

(Continued)

OTHER PUBLICATIONS

International Search Report—PCT/KR2017/015414 dated Mar. 30, 2018.

(Continued)

*Primary Examiner* — Daniel J. Schleis
(74) *Attorney, Agent, or Firm* — Cantor Colburn LLP

(57) ABSTRACT

Provided is a hot dip aluminized steel material including a base steel and a hot-dip Al—Si-coated layer, wherein the surface layer of the base steel is provided with an Al-enriched layer in which 2 wt % to 20 wt % of Al is solid-solubilized, and an interface between the base steel and the hot-dip Al—Si-coated layer has a double-layer structured interfacial alloy layer having different hardnesses.

9 Claims, 1 Drawing Sheet

(51) Int. Cl.
*C23C 2/12* (2006.01)
*C23C 2/16* (2006.01)
*C23C 2/28* (2006.01)

(56) References Cited

U.S. PATENT DOCUMENTS

| | | | |
|---|---|---|---|
| 2012/0085467 A1* | 4/2012 | Thirion | C21D 1/68 |
| | | | 148/525 |
| 2012/0295130 A1 | 11/2012 | Nose et al. | |
| 2014/0150930 A1 | 6/2014 | Lee et al. | |
| 2016/0145733 A1 | 5/2016 | Schwartz | |
| 2016/0362764 A1 | 12/2016 | Sohn et al. | |
| 2016/0376679 A1 | 12/2016 | Kim et al. | |

FOREIGN PATENT DOCUMENTS

| | | |
|---|---|---|
| CN | 106133179 | 11/2016 |
| CN | 106164317 | 11/2016 |
| EP | 1029940 | 8/2000 |
| EP | 1380666 | 1/2004 |
| EP | 3561140 | 10/2019 |
| JP | 2004083988 | 3/2004 |
| JP | 2009120942 | 6/2009 |
| JP | 2010018860 | * 1/2010 |
| JP | 2010508438 | 3/2010 |
| JP | 2015131995 | 7/2015 |
| JP | 2016529386 | 9/2016 |
| KR | 100836282 | 6/2008 |
| KR | 20110050191 | 5/2011 |
| KR | 20120128648 | 11/2012 |
| KR | 101569505 | 11/2015 |
| KR | 101569509 | 11/2015 |
| KR | 20160058746 | 5/2016 |
| WO | 2008053273 | 5/2008 |
| WO | 2016104879 | 6/2016 |

OTHER PUBLICATIONS

European Search Report—European Application No. 17883950.2, dated Nov. 19, 2019, citing WO 2008/053273, EP 3 561 140, EP 1 029 940, EP 1 380 666 and US 2061/376679.
Chinese Office Action—Chinese Application No. 201780079878.0 dated Oct. 13, 2020, citing JP 2010-018860, CN 106133179, CN 102782175, CN 106164317, KR 2011-0050191, and CN 103687973.
Japanese Office Action—Japanese Application No. 2019-533555 dated Aug. 25, 2020, citing JP 2010-508438, JP 2010-018860, JP 2004-083988, and WO 2016/104879.

* cited by examiner

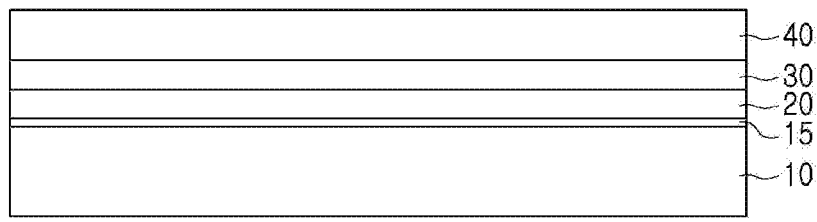

HOT DIP ALUMINIZED STEEL MATERIAL HAVING EXCELLENT CORROSION RESISTANCE AND WORKABILITY, AND MANUFACTURING METHOD THEREFOR

TECHNICAL FIELD

The present disclosure relates to a hot dip aluminized steel material having excellent corrosion resistance and workability, and a method of manufacturing the same.

BACKGROUND ART

Recently, there has been continuing demand for reductions in the weight of automobiles, based on the regulation of carbon dioxide for global environmental preservation and for high strengthening of automotive steel sheets to improve the crash stability of automobiles.

To meet these demands, recently, a high strength steel sheet of 500 MPa to 1 GPa has been developed and applied to automobiles. As a method for increasing the strength of a steel sheet, a steel sheet having high strength may be easily produced by increasing the addition amount of reinforcing components such as carbon. However, in the case of a steel sheet for an automobile body, since cracking should not occur in the process of molding into a car body, ductility of the steel sheet should be secured simultaneously with strength.

To secure both strength and ductility in automotive steel sheets, components such as Mn, Si, Al, Cr, Ti and the like are mainly added to the steel, and when the amount of these additives is appropriately controlled and the manufacturing process conditions are controlled, a steel sheet having high strength and ductility may be produced.

In the other hand, in general, steel sheets used in automobiles are required to have improved corrosion resistance to prolong the life of automobiles, and to this end, hot-dip galvanized steel sheets are used.

In the case of a high strength steel sheet for automobiles having a strength of 900 MPa or more, the steel contains elements such as C, Si, Mn, Al, Ti and Cr. When resistance spot welding is performed on an automobile body assembly using a hot-dip galvanized steel sheet while being hot-dip galvanized, in which a steel sheet having such steel components is used as a base; molten Zn penetrates into the inside of the base iron grain boundaries of a shoulder portion, a heat affected zone of a welded portion, weakening the grain boundary bond. During the welding process, a liquid metal embrittlement (LME) phenomenon occurs in which cracks occur due to stress generated by coagulation shrinkage in cooling on grain boundaries weakened by liquid Zn. When molten aluminum plating is applied to solve the problem of LME cracking due to zinc, although the problem of LME crack may be solved, general aluminum plating does not have sacrificial corrosion resistance properties such as in zinc plating and has a problem in which corrosion resistance is deteriorated, which has a difficulty in being used as a material for use of automotive body.

Various techniques have been proposed to solve these problems. Among them, Patent Document 1 proposes a technique of adding 5 to 15% of Mg to the component of aluminum hot-dip plating. Mg is an element with high oxygen affinity and has the property of oxidizing or corroding more quickly in a corrosive environment than aluminum. Mg reacts with oxygen on the surface of a coated layer in the corrosive environment to form a film-like oxide on the surface, thereby preventing secondary corrosion in which oxidation occurs in the coated layer or the aluminum is exposed to the surface layer to be oxidized to secure corrosion resistance. To secure corrosion resistance of aluminum hot-dip plating using sacrificial corrosion resistance properties of Mg, it is necessary to add Mg in an amount of 5% or more. However, when Mg is added to a plating bath in an amount of 5% or more, the amount of oxides and dross formed by Mg increases sharply, resulting in an increase in the defect rate on the steel sheet surface and there may be difficulty in maintaining the composition in the plating bath containing Mg. Production management and cost increases may be problematic.

In the other hand, Patent Document 2 proposes a technique of alloying an aluminum-silicon plated steel sheet formed through hot-dip coating by heat treatment. This technique is a method in which aluminum-silicon hot-dip coating is formed on a steel sheet, the steel sheet is cooled to room temperature and wound, and then, the specimens sheared to a certain size are individually heat treated to be subjected to being alloyed. This method is mainly a method for hot press working, in which the aluminum silicon plated steel sheet is heated to the temperature of an austenite stabilizing zone and held for several minutes to alloy the plated layer, to facilitate machining after imparting ductility to the steel sheet, quenching is carried out after machining to forma high-strength martensite phase, thereby increasing the strength of a molded product. In this method, since a period of heat treatment time is prolonged for several minutes and the diffusion amount of Fe in a plated layer is increased, an alloy phase is only formed as an alloy phase having a high Fe content, and the alloying is progressed by heat treatment in the cutting specimen unit. Thus, it is difficult to produce an aluminum alloy plated steel sheet through a continuous process.

PRIOR ART DOCUMENTS

Patent Document (Patent Document 1) Korean Patent Laid-Open Publication No. 10-2012-0128648
(Patent Document 2) Korean Patent Registration Publication No. 10-0836282

DISCLOSURE

Technical Problem

An aspect of the present disclosure is to provide a hot dip aluminized steel material having excellent corrosion resistance and workability and a method of manufacturing the same.

Technical Solution

According to an aspect of the present disclosure, a hot dip aluminized steel material includes a base steel, and a hot-dip aluminum-silicon (Al—Si)-coated layer. A surface layer of the base steel is provided with an Al-enriched layer in which 2 wt % to 20 wt % of Al is solid-solubilized, and an interface between the base steel and the hot-dip Al—Si-coated layer is provided with an interfacial alloy layer having a double layer structure with different degrees of hardness.

According to another aspect of the present disclosure, a method of manufacturing a hot dip aluminized steel material includes immersing a base steel in a hot dip plating bath comprised of, by weight %, 2 to 13% of Si, a remainder of Al and unavoidable impurities, the base steel having an introduction temperature within a range of $T_B+40°$ C. to $T_B+100°$ C., to then be subjected to plating; controlling an amount of plating solution adhered to a surface of the base steel by an air knife; and subjecting the base steel having a controlled plating amount to an alloying heat treatment.

Advantageous Effects

According to an embodiment in the present disclosure, a hot dip aluminized steel sheet has excellent corrosion resistance and processability.

The various and advantageous advantages and effects of the present disclosure are not limited to the above descriptions, and may be more easily understood in the course of describing a detailed embodiment of the present disclosure.

DESCRIPTION OF DRAWINGS

FIG. 1 is a schematic view of a hot dip aluminized steel material according to an embodiment in the present disclosure.

BEST MODE FOR INVENTION

Hereinafter, a hop dip aluminized steel material having excellent corrosion resistance and workability according to an embodiment in the present disclosure will be described in detail.

FIG. 1 is a schematic view of a hot dip aluminized steel material 100 according to an embodiment in the present disclosure. Referring to FIG. 1, a hot dip aluminized steel material 100 according to an embodiment includes a base steel 10, a lower alloy layer 20, an upper alloy layer 30 and a hot-dip Al—Si-coated layer 40, provided in sequence.

First, the alloy composition and the detailed composition range of the hot-dip Al—Si-coated layer 40 will be described in detail.

The hot-dip Al—Si-coated layer 40 includes Si, and includes Al and unavoidable impurities as the remainder thereof. The hot-dip Al—Si-coated layer 40 may further include one or more of Be and Sr, as required.

The Si content may be 2 to 13 wt %. Si forms a binary alloy with Al, and has a eutectic point at an Si content of about 12 wt %, such that a melting point of the alloy may be relatively lowest. The melting point of an aluminum ingot is lowered when Si is added, and the plating bath temperature may thus be controlled to be relatively low. When the plating bath temperature is lowered, there is an advantage in that the amount of solid dross occurring due to chemical bonding between Fe and Al eluted in the plating bath and between compositional components of the plating bath is reduced. However, if the Si content exceeds 13 wt %, not only the plating bath temperature rises again but also the Si in the coated layer is not solid dissolved in the Al matrix and forms an acicular Si phase. In this case, the formed acicular Si crystal has a high strength and a high brittleness, which may deteriorate the formability of the plated steel. On the other hand, Si serves to suppress the formation of an excessive alloy phase between Fe and Al. If the Si content is less than 2 wt %, the function of suppressing formation of Fe—Al alloy phase is reduced and the Fe—Al alloy phase fraction may become excessive.

The contents of one or more of Be and Sr may be each 0.5 wt % or less. Be and Sr are elements with high oxidizing power. When the above elements are contained in the plating bath, the oxide film of Be and Sr is formed on the surface of the plating bath, and ash generation due to evaporation of the plating bath is decreased. In this case, an oxide film of Be and Sr is also formed on a coated layer surface, and the surface is thus stabilized. However, if the content thereof is excessive, the Be and Sr oxides adhere to the surface of the steel sheet in the form of particles, which may lead to poor surface appearance or unplating. Further, since the production cost is excessively increased, an upper limit of the content thereof is limited to 0.5 wt %.

The remainder of the composition is Al. However, in an ordinary manufacturing process, impurities which are not intended may be inevitably incorporated from a raw material or a surrounding environment, which cannot be excluded. These impurities are known to those skilled in the manufacturing field, and thus, are not specifically mentioned in this specification. These impurities may be, for example, Si, Mn, P, S, Cu, Mg, Zn, Co, Ca, Na, V, Ga, Ge, As, Se, In, Ag, W, Pb and Cd. In the case in which the contents thereof are each less than 0.1%, the effect according to an embodiment in the present disclosure is not deteriorated.

Hereinafter, the base steel 10 will be described in detail. According to an embodiment in the present disclosure, the alloy composition and form of the base steel are not particularly limited, and may be, for example, a steel sheet or a steel wire including alloying elements such as C, Si, Mn, P, S, Al and the like.

A surface layer of the base steel 10 is characterized in that an Al-enriched layer 15, in which 2 wt % to 20 wt % of Al is solid dissolved, is provided thereon.

As described above, the general aluminum plating does not have sacrificial corrosion prevention such as in zinc plating. Thus, in a case in which the plated steel sheet is cut or scratches or the like occur on the surface of a coated layer and the base metal is exposed externally, there is a problem in which the corrosion factors (corrosion-causing substances) penetrate into the base steel having of the cut surface or an area adjacent to scratches in a thickness (depth) direction.

As a result of research, according to an embodiment in the present disclosure, when the Al-enriched layer is formed on the surface layer of the base steel, even in a case in which the coated steel sheet is cut or scratches occur on the surface of the coated layer, corrosion factors proceed in a width direction of the Al-enriched layer of the surface layer of the base steel, not in the thickness direction (depth) of the base steel, such that the corrosion of the base steel may be effectively prevented.

According to an embodiment in the present disclosure, the Al-enriched layer refers to a region containing an Al concentration of 2 wt % or more. As a method for determining the region of the enriched layer, line profile analysis of the coated layer-base steel in a vertical direction of a coated layer-base steel interface is performed using SEM EDS to define a point at which the Al concentration is 2 wt % or more. Further, line profile analysis is performed 20 times at 5 μm intervals in the same specimen to define a boundary provided by connecting points at which the concentration of Al is 2 wt %, and the region within the boundary may be defined as the enriched layer.

The average solid solubility of Al in the Al-enriched layer 15 is, in detail, 2 wt % to 20 wt %, in more detail, 3 wt % to 15 wt %, and in further detail, 5 wt % to 10 wt %. If the content of Al in the Al-enriched layer 15 is too low, there is a fear that the effect of preventing the corrosion of the base steel may be insufficient. On the other hand, if the Al content is too high, due to excessive formation of an Fe—Al based intermetallic compound having high embrittlement, there arises a problem in which the processability during forming may deteriorates.

According to an embodiment in the present disclosure, the method of measuring the solid content of Al in the Al-enriched layer 15 is not particularly limited, but the following method may be used, for example. In detail, after the plated steel sheet is cut vertically, the Al content in a central portion of a region thereof corresponding to the enriched layer in the thickness direction is measured five times, per place, using Energy Dispersive Spectroscopy (EDS). In this case, to increase the accuracy of the analysis, the number of measured places is 30 or more, and the average value of Al solid solubility per each measurement place may be defined as a final Al solid content, and each measurement place may be equidistantly set in a direction perpendicular to the thickness direction.

The ratio of the Al solid content of the Al-enriched layer 15 to the Al solid content of the base steel 10 may be 2 or more, in detail, 3 or more, and in further detail, 5 or more. If the ratio of the Al content is less than 2, the corrosion prevention effect of the base steel may not be sufficient. On the other hand, the ratio of the average Al content is increased, the prevention effect of the corrosion of the base steel may be increased, and the upper limit thereof is not particularly limited according to an embodiment in the present disclosure.

The average thickness of the Al-enriched layer 15 may be 0.5 to 2 µm. If the average thickness thereof is less than 0.5 µm, corrosion may proceed along the Al-enriched layer during corrosion due to an excessively thin thickness, whereas if the average thickness thereof exceeds 2 µm, the Al content in the Al-enriched layer is excessively increased to 20% or more due to an excessive great thickness, such that excessive formation of an Fe—Al-based intermetallic compound having high brittleness may result in deterioration of workability during molding.

Hereinafter, interfacial alloy layers 20 and 30 having a double-layer structure will be described in detail.

The lower alloy layer 20 is formed on the upper side of the base steel 10 to improve plating adhesion. The lower alloy layer 20 is formed of one or more Fe—Al based alloys among $FeAl_2$, $FeAl_3$ and $Fe_2Al_5$, and has a hardness of 800 Hv or more.

The occupied area ratio of the lower alloy layer 20 may be 2% or more, and in more detail, 3% or more. If the occupied area ratio of the lower alloy layer 20 is less than 2%, plating deterioration may cause occurrence of unplating. On the other hand, as the occupied area ratio of the lower alloy layer 20 increases, the improvement in the plating ability may increase. Thus, according to an embodiment in the present disclosure, the upper limit thereof is not particularly limited, but if the occupied area ratio thereof exceeds 20%, brittleness may occur, and the upper limit thereof may thus be limited to 20%. In more detail, an upper limit thereof may be 10%, and in further detail, the upper limit may be 8%. In this case, the occupied area ratio refers to the ratio of a thickness of the lower alloy layer 20 to the sum of thicknesses of the lower alloy layer 20, the upper alloy layer 30 and the hot-dip Al—Si-coated layer 40 when the hop dip aluminized steel material is cut in the thickness direction.

The Fe content in the lower alloy layer 20 may be 45 to 60 wt %. If the Fe content is less than 45 wt %, the Fe—Al-based alloy phase may not be uniformly formed on the base steel surface as a whole. On the other hand, when the Fe content exceeds 60 wt %, an alloy phase other than $FeAl_2$, $FeAl_3$ and $Fe_2Al_5$, among Fe—Al based intermetallic compounds, may be formed.

The upper alloy layer 30 is formed directly on the lower alloy layer 20 to serve as a barrier to prevent corrosion of the lower alloy layer 20 and the base steel 10 from a corrosion factor under a corrosive environment. The upper alloy layer 30 is formed of an Fe—Al—Si based alloy and has a hardness of 350 Hv or more.

The Fe content in the upper alloy layer 30 may be 40 to 65 wt %. If the Fe content is less than 40 wt %, the Fe content required for forming the Fe—Al—Si ternary alloy phase may be insufficient and the alloy phase may not be formed. On the other hand, if the Fe content exceeds 65%, there is a possibility that an Fe ferrite phase containing Al and Si may be formed in excess of the Fe content required for forming the Fe—Al—Si ternary alloy phase is formed.

The Si content in the upper alloy layer 30 may be 5 to 20 wt %, and in detail, 5 to 15 wt %. If the Si content is less than 5 wt %, the Si content required for forming the Fe—Al—Si ternary alloy phase may be insufficient and the alloy phase may not be formed. On the other hand, if the Si content exceeds 20 wt %, the Si content required to form the Fe—Al—Si ternary alloy phase is exceeded and Si thus forms an independent phase, such that brittleness of the coated layer is increased, thereby causing a problem of deterioration in workability.

According to an embodiment in the present disclosure, a method of measuring the Fe and Si contents in the interfacial alloy layers 20 and 30 having the double-layer structure is not particularly limited, but the following methods may be used. For example, after cutting the plated steel sheet vertically, a cross-sectional image is taken at a magnification of 100,000 by a transmission electron microscope (TEM), and Fe and Si contents are measured for five crystal grains in total, in which measurement is performed three times per grain in each alloy layer, using energy dispersive spectroscopy (EDS). An average value thereof may be defined as Fe and Si contents in the interfacial alloy layers 20 and 30 of the double-layer structure.

The above-described hot dip aluminized steel material according to an embodiment in the present disclosure may be manufactured by various methods, and the manufacturing method thereof is not particularly limited. However, as a detailed example, a hop dip aluminized steel material may be manufactured by immersing a base steel in a hot-dip plating bath satisfying the above-mentioned component system to perform plating, controlling the adhesion amount of the plating solution by an air knife, and then performing alloying heat treatment. In this case, in more detail, the above-described hot dip aluminized steel material may be manufactured under the following conditions.

(1) Control of Introduction Temperature of Base Steel into Plating Bath

To sufficiently ensure the Al concentration in the Al-enriched layer, it is necessary to raise the surface temperature of the base steel to a predetermined temperature or higher, before being introduced into the hot-dip Al—Si based plating bath, and then to introduce the base steel into the hot-dip Al—Si based plating bath. In detail, it is necessary to control the introduction temperature of the base steel to be $T_B+40°$ C. to $T_B+100°$ C., where $T_B$ refers to a hot-dip Al—Si based plating bath temperature. If the introduction temperature of the base steel is less than $T_B+40°$ C., the Al concentration in the Al-enriched layer may not be sufficient due to insufficient diffusion of Al, whereas if the Al concentration in the Al-enriched layer exceeds $T_B+100°$ C., the Al concentration in the Al-enriched layer may be excessive, and excessive formation of the Fe—Al-based intermetallic compound having high brittleness may deteriorate the formability during molding.

On the other hand, according to an embodiment in the present disclosure, the temperature of the hot-dip Al—Si based plating bath is not particularly limited, and a normal hot-dip Al—Si based plating bath level may be applied, for example, from 560 to 660° C.

(2) Alloying Heat Treatment is Carried Out Immediately After Controlling a Plating Adhesion Amount facilitate formation of the Al-enriched layer, the alloying heat treatment may be executed immediately after the plating amount is controlled. In this case, immediate execution may mean that the alloying heat treatment is performed before the surface temperature of a hot-dip Al—Si plated steel having the controlled plating amount reaches a melting point of the hot-dip Al—Si-coated layer. If the alloying heat treatment is performed after the surface temperature of the hot-dip Al—Si plated steel reaches a temperature below the melting point of the hot-dip Al—Si-coated layer, diffusion of Al in the hot-dip Al—Si-coated layer into the base steel is not facilitated even in the case in which the alloying heat treatment is performed, and it may thus be difficult to form the required Al-enriched layer.

(3) Alloying Heat Treatment is Performed by Induction Heating Method

Although as the alloying heat treatment, various heat treatment methods may be used, in detail, the alloying heat treatment by an induction heating method may be used to facilitate the formation of the Al-enriched layer. Unlike other methods, when the heat treatment is performed using the induction heating method, since a temperature of interface between the hot-dip Al—Si-coated layer and the base steel is higher than that of the surface of the hot-dip Al—Si-coated layer during the heat treatment, diffusion of Al in the hot-dip Al—Si-coated layer into the base steel may be facilitated.

(4) Alloying Heat Treatment Condition Control

To obtain a required interfacial alloy layer having a double-layer structure, during the alloying heat treatment, the heating temperature may be 700 to 900° C., and the holding time at the heating temperature may be controlled to be 2 to 60 seconds. If the heating temperature is less than 700° C. or the holding time is less than 2 seconds, it may be difficult to form the interfacial alloy layer having the double-layer structure. On the other hand, if the heating temperature exceeds 900° C. or the holding time exceeds 60 seconds, excessive alloying may occur and formability during molding may deteriorate.

On the other hand, a heating rate to the heating temperature may be controlled to be 10 to 350° C./sec., which is performed to obtain the required Al-enriched layer and the interfacial alloy layer of the double-layer structure. If the temperature raising rate is outside of the above range, the Al concentration in the Al-enriched layer is outside of the range proposed according to an embodiment in the present disclosure, or alloying is excessive, thereby resulting in deterioration in processability during molding.

Mode for Invention

Hereinafter, embodiments in the present disclosure will be described in more detail with reference to examples. However, the description of these embodiments is intended only to illustrate the practice of the present disclosure, but the present disclosure is not limited thereto. The scope of the present disclosure is determined by the matters described in the claims and the matters reasonably deduced therefrom.

Embodiment

A Slab having a composition of 0.15 wt % of C, 1.0 wt % of Si, 2.3 wt % of Mn, 0.037 wt % of Al, 0.5 wt % of Ti, 10 ppm of N, 5 ppm of P, and 13 ppm of S was produced. The slab was maintained at 1200° C. for 1 hour, and then was subjected to finish rolling at 900° C. and cooling to 650° C., and was then maintained for 1 hour in a heat insulation furnace maintained at 650° C., and then subjected to furnace cooling.

The cooled hot rolled steel sheet was visually observed for the occurrence of hot cracks and pickled for 30 seconds in a 60° C. and 17 vol % HCl solution to dissolve an iron oxide on the surface of a steel sheet. In the case in which the pickling of 30 seconds was insufficient in some specimens, additional pickling was carried out for 20 seconds under the same conditions. The pickled steel sheet was subjected to cold rolling at a reduction ratio of 55%.

The cold-rolled steel sheet was subjected to pretreatment to remove foreign matters on the surface, and subjected to a CGL annealing process to be heated at a heating temperature of 843° C. for 60 seconds, and then subjected to reheating annealing through slow cooling (1.6° C./s to 650° C.) and quenching (10° C./s to 350° C.), to then be introduced into the plating baths having the compositions shown in Table 1, respectively. The plating conditions thereof were set to the conditions shown in Table 2. After hot-dip coating, an adhesion amount of plating of the steel sheet, based on one-side surface, was controlled to be 80 g/m$^2$, by using an air knife, and the alloying heat treatment of the steel sheet was performed under the heat treatment conditions shown in Table 2 by an induction heating method, before reaching a melting point of the coated layer, to then be cooled. In this case, in all examples, the heating rate was constant at a rate of 30° C./sec.

Then, for the evaluation of corrosion resistance, the salt spray test (SST) was carried out. After 40 hours of operation of salt spray test, red rust occurred on the surface of the alloy-plated steel sheet was removed and a corrosion depth was then measured using a micrometer, and the measurement results are shown in Table 3 below. In addition, the alloy-plated steel sheet was molded as a '⊏' shaped mini bumper at room temperature, and it is visually confirmed that the occurrence of cracks in a processed part, and the results are shown in Table 3 below.

TABLE 1

| Plating Bath Type | Plating Bath composition (wt %) | | | |
| --- | --- | --- | --- | --- |
| | Si | Be | Sr | Al |
| A | 7.3 | 0.0 | 0.0 | Remainder |
| B | 8.9 | 0.0 | 0.0 | Remainder |
| C | 18 | 0.0 | 0.0 | Remainder |
| D | 16 | 0.0 | 0.0 | Remainder |
| E | 5.7 | 0.0 | 0.0 | Remainder |
| F | 11.8 | 0.0 | 0.0 | Remainder |
| G | 0.3 | 0.0 | 0.0 | Remainder |
| H | 7.1 | 0.0017 | 0.0 | Remainder |
| I | 8.4 | 0.0 | 0.0032 | Remainder |

TABLE 2

| Classification | Plating Bath Type | Plating Conditions | | Heat Treatment Conditions | |
|---|---|---|---|---|---|
| | | Introduction Temperature (° C.) | Plating Bath Temperature (° C.) | Heating Temperature (° C.) | Holding Period of Time (s) |
| Embodiment Example 1 | E | 657 | 573 | 790 | 12 |
| Embodiment Example 2 | A | 675 | 632 | 780 | 10 |
| Embodiment Example 3 | F | 700 | 653 | 820 | 7 |
| Embodiment Example 4 | E | 693 | 631 | 790 | 12 |
| Embodiment Example 5 | B | 699 | 655 | 832 | 7 |
| Embodiment Example 6 | H | 675 | 632 | 780 | 10 |
| Embodiment Example 7 | I | 699 | 655 | 832 | 7 |
| Comparative Example 1 | A | 665 | 638 | 695 | 10 |
| Comparative Example 2 | G | 678 | 651 | 680 | 9 |
| Comparative Example 4 | B | 743 | 631 | 860 | 11 |
| Comparative Example 5 | C | 675 | 653 | 833 | 13 |
| Comparative Example 6 | G | 750 | 633 | 870 | 12 |
| Comparative Example 7 | E | 753 | 730 | 810 | 10 |
| Comparative Example 8 | D | 692 | 669 | 790 | 12 |
| Comparative Example 9 | G | 850 | 693 | 865 | 12 |
| Comparative Example 10 | A | 645 | 631 | 754 | 15 |
| Comparative Example 11 | C | 670 | 603 | 782 | 11 |
| Comparative Example 12 | D | 672 | 610 | 790 | 12 |
| Comparative Example 13 | G | 691 | 650 | 791 | 10 |

TABLE 3

| Classification | Al Concentration in Al-enriched layer (wt %) | Enriched Layer Thickness (μm) | Lower Alloy Phase Area (%) | Whether or not upper alloy phase (Fe—Al—Si) is generated | Si Content in Coated Layer (wt %) | Corrosion Depth (μm) | Red Rust Occurrence Time (h) | Whether or not cracks occur on processed part |
|---|---|---|---|---|---|---|---|---|
| Embodiment Example 1 | 8 | 1.45 | 4.1 | O | 5.4 | 45 | 340 | X |
| Embodiment Example 2 | 2.5 | 0.85 | 3.5 | O | 7.18 | 37 | 360 | X |
| Embodiment Example 3 | 6.1 | 1.25 | 4.08 | O | 11.05 | 27 | 340 | X |
| Embodiment Example 4 | 6.8 | 1.32 | 4.15 | O | 5.15 | 37 | 320 | X |
| Embodiment Example 5 | 5.7 | 1.08 | 3.75 | O | 5.45 | 62 | 340 | X |
| Embodiment Example 6 | 2.6 | 0.85 | 3.01 | O | 8.14 | 48 | 357 | X |
| Embodiment Example 7 | 5.45 | 0.97 | 3.95 | O | 5.24 | 63 | 362 | X |
| Comparative Example 1 | 1.7 | 0.32 | 2.1 | O | 7.21 | 120 | 351 | X |
| Comparative Example 2 | 1.2 | 0.28 | 11.5 | X | 0.18 | 153 | 358 | O |
| Comparative Example 4 | 22 | 3.75 | 10.5 | O | 8.82 | 212 | 45 | O |

TABLE 3-continued

| Classification | Al Concentration in Al-enriched layer (wt %) | Enriched Layer Thickness (μm) | Lower Alloy Phase Area (%) | Whether or not upper alloy phase (Fe—Al—Si) is generated | Si Content in Coated Layer (wt %) | Corrosion Depth (μm) | Red Rust Occurrence Time (h) | Whether or not cracks occur on processed part |
|---|---|---|---|---|---|---|---|---|
| Comparative Example 5 | 1.5 | 0.31 | 5.4 | O | 17.45 | 123 | 273 | O |
| Comparative Example 6 | 21.8 | 3.68 | 12.5 | X | 0.17 | 275 | 193 | O |
| Comparative Example 7 | 0.8 | 0.19 | 1.85 | O | 5.23 | 315 | 251 | X |
| Comparative Example 8 | 0.7 | 0.15 | 1.52 | O | 15.2 | 325 | 198 | O |
| Comparative Example 9 | 21.8 | 4.05 | 13.2 | X | 0.21 | 215 | 12 | O |
| Comparative Example 10 | 1.05 | 0.42 | 2.15 | O | 7.19 | 243 | 283 | X |
| Comparative Example 11 | 25 | 4.02 | 6.4 | O | 18.3 | 245 | 245 | O |
| Comparative Example 12 | 23 | 3.74 | 5.7 | O | 19.2 | 256 | 211 | O |
| Comparative Example 13 | 1.2 | 0.23 | 1.51 | X | 0.27 | 294 | 8 | O |

As Embodiment examples 1 to 7 satisfied all of the conditions proposed according to an embodiment in the present disclosure, an Al-enriched layer as a surface layer of the base steel layer was generated. An Al concentration in the Al-enriched layer was within the range of 2 to 20%, and a thickness of the Al-enriched layer was in the range of 0.5 to 2 μm. After 40 days of the salt spray test, the corrosion depth was 100 μm or less in a good state. In the plated layer, a lower alloy phase was formed, which satisfied the composition and thickness range proposed according to an embodiment in the present disclosure, and an upper alloy phase, an Fe—Al—Si alloy phase, was present, and cracking did not occur during processing. In Embodiment Examples 6 to 7 in which Be or Sr was contained in a small amount in the plating bath, generation of ash due to vaporization of Al was relatively small during the plating process, and workability was good.

In Embodiment Examples 1 to 7, the lower alloy phases contained one of FeAl2, FeAl3 and Fe2Al5, and all thereof had a hardness higher than 820 Hv, and the upper alloy phases were formed of an Fe—Al—Si alloy and had a hardness higher than 370 Hv.

In Comparative Examples 1, 2, 5, 7, 8 and 10, since plating and alloying proceeded in a state in which the plating bath entry temperature of the steel sheet was not sufficiently high as compared with the plating bath temperature, the Al concentration in the Al-enriched layer was less than 2%, and the thickness of the enriched layer was less than 0.5 μm. The area of the lower alloy phase was also less than 3%. In this case, the measured corrosion depth was 100 μm or more, causing poor corrosion resistance.

In Comparative Examples 4, 6 and 9, plating and alloying proceeded in a state in which the introduction temperature of the steel sheet was excessively high as compared with the plating bath temperature, such that the diffusion of Al into the base steel excessively occurred and thus the Al concentration in the Al-enriched layer exceeded 20%, and the thickness of the enriched layer was also more than 2 μm. In this case, the lower phase having high hardness and high brittleness was excessively formed, and a crack occurred in the coated layer during processing. As a result of the corrosion depth measurement, the corrosion depth was 200 μm, causing deterioration in corrosion resistance.

In Comparative Examples 2, 6 and 9, the Si content in the coated layer was less than 2 wt %, which was lower than the range suggested according to an embodiment in the present disclosure. The lower Si content in the coated layer were due to the low Si content in the plating bath, and an Fe—Al—Si phase, which is the upper alloy phase, could not be formed due to the relatively low Si content in the coated layer, and the lower alloy phase was thus excessively developed. Cracks occurred during processing due to excessive development of the lower alloy phase having high hardness and brittleness.

In Comparative Examples 5 and 8, the Si content in the coated layer exceeded 13 wt % and exceeded the range suggested according to an embodiment in the present disclosure, due to the high Si contents in the plating bath. Si formed independent phases due to the high Si contents in the coated layer, and cracks occurred during processing due to the high brittleness of the independent Si phases.

In Comparative Examples 11, 12 and 13, the manufacturing conditions of the coated layer satisfied the range suggested according to an embodiment in the present disclosure, but the composition of the plating bath was outside of the range suggested according to an embodiment in the present disclosure. When the Si content of the plating bath was insufficient, a sufficient alloy phase could not be formed after the alloying process, and thus, corrosion resistance could not be secured. When the Si content of the plating bath exceeded the range suggested according to an embodiment in the present disclosure, the Fe—Al alloy phase having a high strength and high brittleness was excessively formed and the workability was poor.

The invention claimed is:
1. A hot dip aluminized steel material comprising:
a base steel; and
a hot-dip aluminum-silicon (Al—Si)-coated layer,
wherein a surface layer of the base steel is provided with an Al-enriched layer in which 2 wt % to 20 wt % of Al is solid-solubilized, and an interface between the base steel and the hot-dip Al—Si-coated layer is provided with an interfacial alloy layer having a double layer structure, wherein the double layer structure comprises: a lower alloy layer disposed on the base steel and having a first Vickers hardness, and an upper alloy layer disposed on the lower alloy layer and having a second Vickers hardness lower than the first Vickers hardness, and wherein an occupied area ratio of the lower alloy layer is 2~20% of a total area of the lower alloy layer, the upper alloy layer and the hot-dip Al—Si-coated layer.

2. The hot dip aluminized steel material of claim 1, wherein a ratio of an average Al content of the Al-enriched layer to an average Al content of the base steel is 2 or more.

3. The hot dip aluminized steel material of claim 1, wherein the Al-enriched layer has an average thickness of 0.5 to 2 μm.

4. The hot dip aluminized steel material of claim 1, wherein the lower alloy layer is formed of one or more iron-aluminum (Fe—Al) alloys among $FeAl_2$, $FeAl_3$ and $Fe_2Al_5$, and has a hardness of 800 Hv or more.

5. The hot dip aluminized steel material of claim 4, wherein the lower alloy layer comprises 45 to 60 wt % of Fe.

6. The hot dip aluminized steel material of claim 1, wherein the upper alloy layer is formed of an Fe—Al—Si alloy and has a hardness of 350 Hv or more.

7. The hot dip aluminized steel material of claim 6, wherein the upper alloy layer comprises 40 to 65 wt % of Fe and 5 to 20 wt % of Si.

8. The hot dip aluminized steel material of claim 1, wherein the hot-dip Al—Si-coated layer comprises 2 to 13 wt % of Si.

9. The hot dip aluminized steel material of claim 8, wherein the hot-dip Al—Si-coated layer further comprises one or more of beryllium (Be) of not more than 0.5 wt % and strontium (Sr) of not more than 0.5 wt %.

* * * * *